United States Patent [19]

Cloutier

[11] Patent Number: 4,860,966
[45] Date of Patent: Aug. 29, 1989

[54] FILM CASSETTE

[75] Inventor: Robert P. Cloutier, Spencerport, N.Y.

[73] Assignee: Eastman Kodak Company, Rochester, N.Y.

[21] Appl. No.: 173,393

[22] Filed: Mar. 25, 1988

[51] Int. Cl.$^4$ ............................................. G03B 17/26
[52] U.S. Cl. ................................... 242/71.1; 354/275
[58] Field of Search ...................... 242/71, 71.1, 71.2, 242/71.8, 71.9, 73; 354/275

[56] References Cited

U.S. PATENT DOCUMENTS

| 988,341 | 4/1911 | Hill . | |
|---|---|---|---|
| 2,541,476 | 2/1951 | Mihalyi . | |
| 3,234,024 | 2/1966 | Leinonen . | |
| 3,659,799 | 5/1972 | Cerutti et al. . | |
| 3,677,499 | 7/1972 | Wangerin . | |
| 3,797,777 | 3/1974 | Hosono et al. . | |
| 4,407,579 | 10/1983 | Huff | 354/275 |
| 4,423,943 | 1/1984 | Gold . | |
| 4,488,796 | 12/1984 | Edwards | 242/71.1 X |

Primary Examiner—Stuart S. Levy
Assistant Examiner—Steven M. duBois
Attorney, Agent, or Firm—Roger A. Fields

[57] ABSTRACT

In a film cassette, a convoluted film roll is wound on a spool between a pair of coaxially spaced flanges of the spool. A plurality of rigid constraining projections fixed to the respective undersides of the flanges radially confine the outermost convolution of a widened film leader to prevent the film roll from radially expanding into contact with the cassette shell. The constraining projections are each arranged in a slipping relation with the outermost convolution of the widened leader to allow the outermost convolution to readily slide in contact with the constraining projections in order to facilitate a limited degree of radial expansion of the film roll. When the spool is rotated in an unwinding direction, the film roll will tend to expand radially since the inner end of the filmstrip is attached to the spool, and the spool will rotate the film roll in the unwinding direction. Successive sections of the outermost convolution of the widened leader will therefore be advanced past a stripper-guide which frees the leader sections from the radial confinement of respective ones of the constraining projections and guides the freed sections out of a cassette opening.

9 Claims, 2 Drawing Sheets

FILM CASSETTE

BACKGROUND OF THE INVENTION

1. Field of the Invention

The invention relates generally to the field of photography, and more particularly to a film cassette containing roll film.

2. Description of the Prior Art

In the standard 35 mm film manufacturers' cassette, such as manufactured by Eastman Kodak Co. and Fuji Photo Film Co., Ltd., the filmstrip is wound on a flanged spool which is rotatably supported within a cylindrical shell. A leading end section of the filmstrip approximately 2⅜ inches long, commonly referred to as a "film leader", protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader section protruding from the slit will remain stationary. The film roll can expand radially until a non-slipping relation is established between its outermost convolution and the inner curved wall of the shell. Once this non-slipping relation exists, there is a binding effect between the film roll and the shell which prevents further rotation of the spool in the unwinding direction. Thus rotation of the spool in the unwinding direction cannot serve to advance the filmstrip out of the shell, and it is necessary in the typical 35 mm camera to engage the protruding leader section to draw the filmstrip out of the shell.

Representative patent art is as follows:

(a) U.S. Pat. No. 988,341, patented Apr. 4, 1911, discloses a film spool having a pair of coaxially spaced flanges between which a film and paper roll is wound on the spool to form alternating convolutions of photographic film and paper. The film and paper roll appears to be very tightly wound on the spool to prevent ambient light from reaching the successive film convolutions. Several dimples positioned on the respective undersides of the two flanges firmly secure the outermost film convolution and the outermost paper convolution in place to prevent their movement with respect to the dimples. This is done to maintain the tight winding of the roll. When the spool is loaded in a camera, it must be done in subdued light because the outermost film convolution and the outermost paper convolution have to be manually disengaged from the several dimples in order to secure the film and paper leading ends to a take-up means. However, disengagement of the outermost film and paper convolutions from the dimples might allow the roll to unwind or clock-spring about the spool. Thus the facility of the roll to light-shield the successive film convolutions would be lost.

(b) U.S. Pat. No. 3,797,777, patented Mar. 19, 1974, discloses a tape storage magazine containing a rotatable reel having a pair of coaxially spaced flanges between which a magnetic tape roll is tightly wound on the spool. The outermost tape convolution between the two flanges is connected to, though is spaced from, the innermost convolution of a wider stiffer leader tightly coiled at the circumferential edges of the flanges. A number of flexible fingers integrally formed with at least one of the flanges radially extend beyond the circumferential edges(s) of the flange(s) to transversely pinch the contiguous leader convolutions to prevent them from contacting the magazine wall. The forward end of the stiffer wider leader is positioned within the storage magazine and it slightly extends beyond the range of the flexible fingers. When the reel is rotated in an unwinding direction, the flexible fingers propel the outermost leader convolution past a stationary disengaging member to strip successive sections of the wider leader from engagement with the respective fingers. The flexible fingers where engaged with the contiguous leader convolutions serve to thrust the freed leader sections along a predetermined threading path from the storage magazine. However, since the tape leader must be grabbed by the flexible fingers with a sufficient force to thrust the freed leader sections along the threading path, it is possible that the fingers may damage the tape leader, in which instance a leader jam could result.

SUMMARY OF THE INVENTION

The invention advantageously solves the prior art problems described above by providing an improved film cassette wherein a film spool when rotated in an unwinding direction automatically advances the filmstrip out of the cassette shell without damaging the filmstrip. With such an improvement, the prior art need for a protruding film leader is eliminated.

According to one example of the invention, there is generally provided an improved film cassette wherein (a) a spool is rotatable in an unwinding direction within a cassette shell having a film passage slit and (b) a convoluted film roll wound on said spool tends to expand radially and has an inner end attached to the spool, and wherein the improvement comprises:

constraining means defining an annular circumferential boundary spaced from said cassette shell for radially confining an outermost convolution of said film roll to prevent the film roll from radially expanding sufficiently to position said outermost convolution substantially in contact with the shell, said constraining means being rotatable with said spool in the unwinding direction and arranged in a slipping relation with said outermost convolution along said circumferential boundary to allow the outermost convolution to readily slide in contact with the constraining means in order to facilitate radial expansion of said film roll to said constraining means; and release means for freeing successive sections of said outermost convolution from the radial confinement of said constraining means as the constraining means is rotated with said spool in the unwinding direction, whereby said spool when rotated in the unwinding direction can thrust freed sections of said outermost convolution through said film passage slit.

Because the outermost convolution of the film roll can readily slide in contact with the constraining means to allow some radial expansion of the film roll, the spool when rotated in the unwinding direction can serve to thrust freed sections of the outermost convolution from the cassette shell. Moreover, since the constraining means does not grab or pinch the outermost convolution, there is little or no chance of damaging the outermost convolution and causing a film jam.

According to another example of the invention, the constraining means need not be rotatable with the spool in the unwinding direction as in the first example, but simply may be rotatable in an absolute non-driving non-engaging relation with the outermost convolution of the film roll to allow only the spool when rotated in the unwinding direction to similarly rotate the outermost convolution. Thus in this example as in the first one, the spool since it is attached to the inner end of the film roll can thrust freed sections of the outmost convolution from the cassette shell when it is rotated in the unwinding direction.

Preferably, the invention is embodied in a film cassette wherein a convoluted film roll is wound on a spool between a pair of coaxially spaced flanges of the spool. Several evenly spaced rigid constraining projections fixed to the respective undersides of the flanges radially confine the outermost convolution of a widened film leader to prevent the film roll from radially expanding into contact with the cassette shell. The constraining projections are each arranged in a slipping relation with the outermost convolution of the widened leader to allow the outermost convolution to readily slide in contact with the constraining projections in order to facilitate a limited degree of radial expansion of the film roll. When the spool is rotated in an unwinding direction, the film roll will tend to expand radially since the inner end of the filmstrip is attached to the spool, and the spool will rotate the film roll in the unwinding direction. Successive sections of the outermost convolution of the widened leader will therefore be advanced past a stripper-guide which frees the leader sections from the radial confinement of respective ones of the constraining projections and guides the freed sections out of a cassette opening.

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
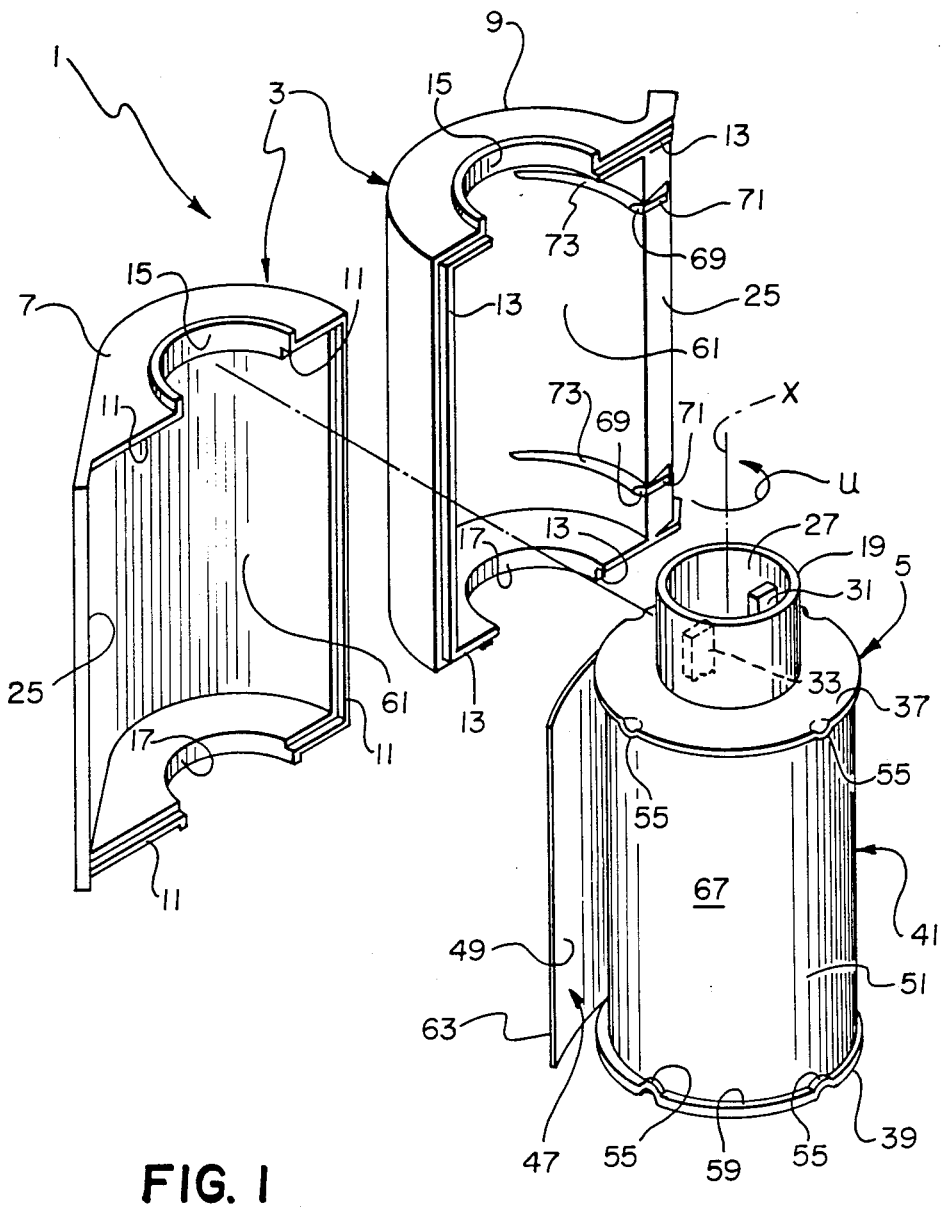
FIG. 1 is an exploded perspective view of an improved film cassette according to a preferred embodiment of the invention.
Figure 2:
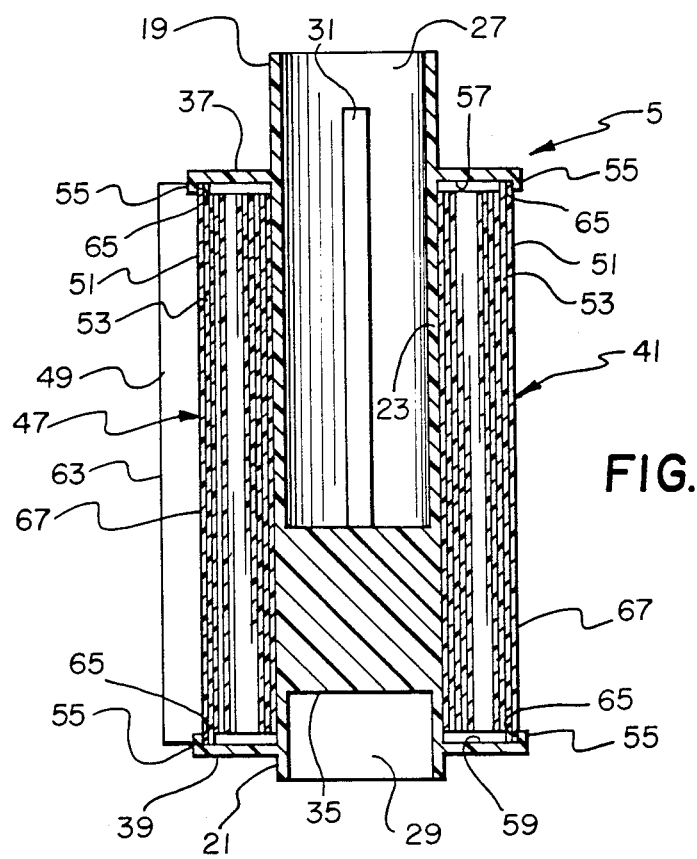
FIG. 2 is an elevation view in cross-section of a film spool and a roll of convoluted film wound on the spool, the spool being rotatable within the cassette shell.
Figure 3:
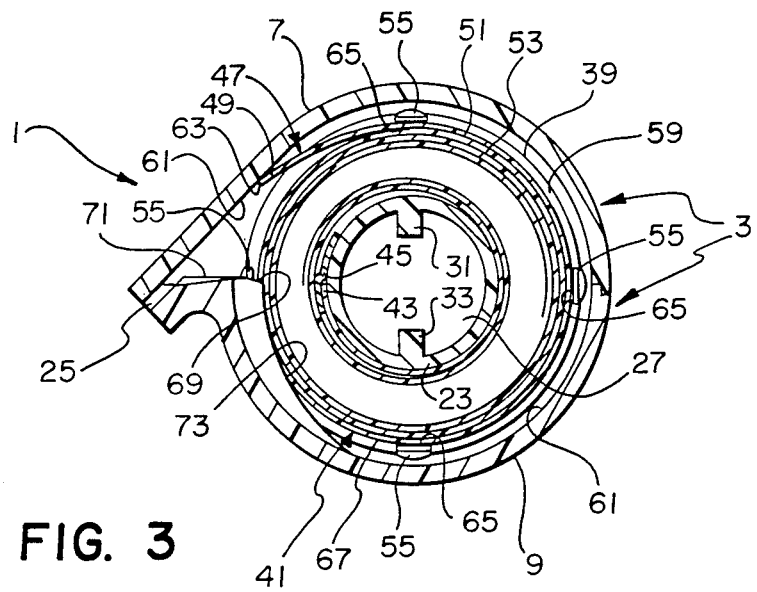
FIG. 3 is an end view in cross-section of the film spool and the cassette shell.

Referring now to the drawings, FIGS. 1-3 depict an improved 35 mm film cassette 1 comprising a light-tight cassette shell 3 and a film spool 5 rotatable about an axis X within the cassette shell. The cassette shell 3 consists of two shell halves 7 and 9 which are mated along respective stepped edges portions 11 and 13. The mated halves 7 and 9 define upper and lower aligned opening 15 and 17 for relatively longer and shorter opposite end extensions 19 and 21 of a spool core or hub 23. Also, they define a light-trapped film passage slit or mouth 25. The light-trapping means for preventing ambient light from entering the film passage slit 25, although not shown, may be a known velvet or plush material which lines the interior of the slit.

The spool core 23 as shown in FIGS. 1-3 includes relatively longer and shorter coaxial holes 27 and 29 opening at the respective longer and shorter opposite end extensions 19 and 21 of the spool core. A pair of spaced keying ribs 31 and 33 integrally formed with the spool core 23 are located within the longer coaxial hole 27, and a single keying rib 35 similarly formed with the spool core is located within the shorter coaxial hole 29. The several keying ribs 31, 33, and 35 according to custom may be engaged to rotate the film spool in an unwinding direction indicated by the arrow U in FIG. 1, or to rotate the spool in a winding direction opposite to the unwinding direction.

A pair of disk-like flanges 37 and 39 integrally formed with the spool core 23 are coaxially spaced to contain a roll 41 of convoluted 35 mm film wound on the spool core. As indicated in FIG. 1, the flange 37 is located immediately beneath the upper opening 15 of the cassette shell 3 and the flange 39 is located immediately above the lower opening 17 of the shell to effectively light-lock these openings. The film roll 41 has an inner end 43 attached to the spool core 23 by a suitable piece of adhesive tape 45 and includes a widened film leader 47 consisting of a leading or forward end section 49 and a main section comprising approximately two and one-half convolutions of the film roll. See FIGS. 1-3. One of these convolutions is the outermost convolution 51 and another of them is the next succeeding convolution 53. Thus the widened leader could serve as a light shield for the remainder of the film roll 41.

Several evenly spaced rigid constraining projections 55 integrally formed with the two flanges 37 and 39 project from the respective undersides 57 and 59 of the flanges to radially confine the outermost convolution 51 of the film roll to prevent the roll from radially expanding or clock-springing into contact with an interior wall 61 of the cassette shell 3. The leading end section 49 of the widened leader 47 protrudes from between the two flanges 37 and 39 and therefore it is not confined by any of the constraining projections 55. Preferably, the tip 63 of the leading end section 49 rests lightly against the cassette wall 61. See FIG. 3.

The constraining projections 55 located on the respective flanges 37 and 39 are aligned as shown in FIGS. 1 and 2, and they are spaced apart an axial distance which is slightly less than the width of the film leader 47 and is approximately equal to the width of the remainder of the film roll 41. Of course, it is possible for the width of the remainder of the film roll 41 to be slightly less or slightly greater than the axial distance separating the constraining projections 55. Moveover, it is possible for the film leader 47 to have the same width as the remainder of the film roll 41, in which instance the axial distance separating the constraining projections 55 would be slightly less than that width.

As shown in FIG. 2, the constraining projections 55 each include an inner constraining surface 65 which is disposed substantially flush with outer annular face 67 of the outermost convolution 51 of the film roll 41. The constraining surface 65 is substantially smooth, either because it is polished or it is coated with a slippery material, and preferably the film roll 41 is not very tightly wound on the spool core 23. The smoothness of the constraining surface 65 and the non-compactness of the film roll 41 enable a slipping (non-binding) relation to exist between the constraining surface and the convolution face 67, thereby allowing the outermost convolution 51 to readily slide in contact with the constraining projections 55 in order to facilitate a limited degree of radial expansion of the film roll. Thus, an absolute non-driving non-engaging relation is effected between the constraining surface 65 and the convolution face 67 which permits only the film spool 5 (rather than the constraining projections 55) when it is rotated in the unwinding direction U to similarly rotate the outermost convolution 51.

OPERATION

When the film spool 5 is rotated in the unwinding direction U, the film roll 41 will tend to expand radially since its inner end 43 is attached to the spool core 23, and the film spool will similarly rotate the film roll including its outermost convolution 51. At the same time, the leading end section 49 of the widened leader 47 will be propelled in the unwinding direction U.

When the tip 63 of the leading end section 49 reaches dual stripper surfaces 69 of the cassette half 9, located immediately inwardly of the film passage slit 25, the leading end section will be directed on to dual guide surfaces 71 of the cassette half, located within the film passage slit. As a result, successive sections of the outermost convolution 51 will be freed from the radial confinement of the constraining projections 55 and the freed sections will be thrust out of the film passage slit 25.

Because the outermost convolution 51 can readily slide in contact with the constraining projections 55 to allow some radial expansion of the film roll 41, the film spool 55 when rotated in the unwinding direction U can serve to thrust freed sections of the outermost convolution from the cassette shell 3. Moreover, since the constraining projections 55 do not grab or pinch the outermost convolution 51, there is little or no chance of damaging the outermost convolution and causing a film jam.

Should one wish to rewind a film length back into the cassette shell 3, there are provided dual return surfaces 73 of the cassette half 9, adjoining the respective stripper surfaces 69. When the film spool 5 is rotated in a winding direction opposite to the unwinding direction U, the two return surfaces 73 will urge successive sections of the film length back between the two flanges 37 and 39.

The invention has been described with reference to a preferred embodiment. However, it will be appreciated that variations and modifications can be effected within the ordinary skill in the art without departing from the scope of the invention. For example, the constraining projections 55 need not be located on the two flanges 37 and 39 as in the preferred embodiment. Instead, a constraining ring or other constraining means may be rotatably supported at the interior wall 61 of the cassette shell to generally encircle the outermost convolution 51 of the film roll. All that is necessary is that the constraining means be rotatable to allow the film spool 5 when rotated in the unwinding direction U to similarly rotate the outermost convolution 51 of the film roll 41.

I claim:

1. An improved film cassette wherein (a) a spool is rotatable in an unwinding direction within a cassette shell having a film passage slit and (b) a convoluted film roll wound on said spool tends to expand radially and has an inner end attached to the spool, and wherein the improvement comprises:

constraining means for radially confining successive outermost convolutions of said film roll to prevent the film roll from radially expanding substantially into contact with said cassette shell, said constraining means being rotatable with said spool in the unwinding direction and adapted to allow any outermost convolution of the film roll to readily slide in contact with the constraining means during its radial confinement in order to facilitate radial expansion of said film roll; and release means for freeing successive sections of any outermost convolution of said film roll from its radial confinement as said constraining means is rotated with said spool in the unwinding direction, whereby said spool when rotated in the unwinding direction can thrust freed sections of said outermost convolution through said film passage slit.

2. The improvement as recited in claim 1, wherein said constraining means includes several evenly spaced rigid constraining projections for radially confining said outermost convolution of the film roll at separate locations, and said release means includes fixed stripping means for flexing successive sections of said outermost convolution free of the radial confinement of respective ones of said constraining projections.

3. An improved film cassette wherein (a) a spool is rotatable in an unwinding direction within a cassette shell having a film passage slit and (b) a convoluted film roll wound on said spool tends to expand radially and has an inner end attached to the spool, and wherein the improvement comprises:

constraining means defining an annular circumferential boundary spaced from said cassette shell for radially confining only an outermost convolution of said film roll to prevent the film roll from radially expanding sufficiently to position said outermost convolution substantially in contact with the shell, said constraining means being rotatable with said spool in the unwinding direction and arranged in a slipping non-gripping relation with said outermost convolution at said annular circumferential boundary to allow the outermost convolution to readily slide in contact with the constraining means during its radial confinement in order to facilitate radial expansion of said film roll to the annular circumferential boundary; and release means located inwardly of said film passage slit for freeing successive sections of said outermost convolution from its radial confinement as said constraining means is rotated with said spool in the unwinding direction, whereby said spool when rotated in the unwinding direction will thrust freed sections of said outermost convolution through said film passage slit.

4. The improvement as recited in claim 3, further comprising:

return means for returning successive sections of a film length to the radial confinement of said constraining means when the constraining means is rotated with said spool in a winding direction opposite to the unwinding direction, and wherein said release means and said return means are integrally formed with said cassette shell to define rigid adjoining release and return surfaces.

5. The improvement as recited in claim 3, wherein said spool includes a pair of integral flanges coaxially spaced to contain said film roll between them, said constraining means includes several evenly spaced rigid constraining projections fixed to an underside of at least one of said flanges in overlapping relation with said outermost convolution of the film roll to radially confine the outermost convolution, and said release means includes fixed stripping means integrally formed with said cassette shell for flexing successive sections of said outermost convolution free of the radial confinement of respective ones of said constraining projections.

6. The improvement as recited in claim 3, wherein said outermost convolution of the film roll has an outer annular face, and said constraining means includes an inner constraining surface disposed substantially flush with said outer annular face at a location proximate a longitudinal edge of said outermost convolution to radially confine the outermost convolution, said constraining surface being substantially smooth to allow said outermost convolution to readily slide in contact with the constraining surface.

7. An improved film cassette wherein (a) a spool is rotatable in an unwinding direction within a cassette shell having a film passage slit and (b) a convoluted film roll wound on said spool tends to expand radially and has an inner end attached to the spool, and wherein the improvement comprises:

constraining means for radially confining successive outermost convolutions of said film roll to prevent the film roll from radially expanding substantially into contact with said cassette shell, said constraining means being rotatable in a non-driving non-engaging relation with any outermost convolution of the film roll during its radial confinement to allow only said spool when rotated in the unwinding direction to similarly rotate said outermost convolution; and release means for freeing successive sections of any outermost convolution of the film roll from its radial confinement as the outermost convolution is rotated by said spool in the unwinding direction, whereby said spool when rotated in the unwinding direction can thrust freed sections of said outermost convolution through said film passage slit.

8. An improved film cassette wherein (a) a spool is rotatable in an unwinding direction within a cassette shell having a film passage slit and (b) a convoluted film roll wound on said spool tends to expand radially and has an inner end attached to the spool, and wherein the improvement comprises:

constraining means for radially confining only an outermost convolution of said film roll to prevent the film roll from radially expanding substantially into contact with said cassette shell, said constraining means being rotatable with said spool in the unwinding direction and arranged in a non-driving non-engaging relation with said outermost convolution during its radial confinement to allow the spool rather than the constraining means when they are both rotated in the unwinding direction to similarly rotate the outermost convolution; and release means located inwardly of said film passage slit for freeing successive sections of said outermost convolution from its radial confinement as said constraining means is rotated with said spool in the unwinding direction, whereby said spool when rotated in the unwinding direction will thrust freed sections of said outermost convolution through said film passage slit.

9. The improvement as recited in claim 8, wherein said constraining means is substantially smooth to allow said outermost convolution of the film roll to readily slide in contact with the constraining means in order to facilitate radial expansion of said film roll.

* * * * *